United States Patent [19]

Taniguchi et al.

[11] 4,374,158

[45] Feb. 15, 1983

[54] PROCESS FOR PRODUCING TRANSPARENT SHAPED ARTICLE HAVING ENHANCED ANTI-REFLECTIVE EFFECT

[75] Inventors: Takashi Taniguchi, Shiga; Jiro Mibae, Otsu, both of Japan

[73] Assignee: Toray Industries, Inc., Tokyo, Japan

[21] Appl. No.: 205,346

[22] Filed: Nov. 10, 1980

[30] Foreign Application Priority Data

Nov. 14, 1979 [JP] Japan ............................. 54-146485
Sep. 4, 1980 [JP] Japan ............................. 55-121745

[51] Int. Cl.$^3$ ............................................. B05D 3/14
[52] U.S. Cl. ................................... 427/41; 427/162; 427/164; 427/165
[58] Field of Search .................. 427/39, 40, 41, 162, 427/164, 165

[56] References Cited

U.S. PATENT DOCUMENTS

| | | | |
|---|---|---|---|
| 2,536,764 | 1/1951 | Moulton | 427/162 |
| 3,526,530 | 9/1970 | Sams et al. | 427/165 |
| 3,679,451 | 7/1972 | Marks et al. | 427/26 |
| 4,096,315 | 6/1978 | Kubacki | 427/41 |
| 4,114,983 | 9/1978 | Maffitt et al. | 427/164 |
| 4,137,365 | 1/1979 | Wydeven et al. | 427/40 |

*Primary Examiner*—John H. Newsome
*Attorney, Agent, or Firm*—Austin R. Miller

[57] ABSTRACT

A transparent shaped article having an enhanced anti-reflective effect is produced by treating with an activated gas the surface of a transparent shaped article having a surface layer containing a finely divided particulate inorganic substance having an average particle size of from about 1 to about 300 milli-microns. If desired, the transparent shaped article treated with the activated gas is coated with a protective coating material.

19 Claims, No Drawings

PROCESS FOR PRODUCING TRANSPARENT SHAPED ARTICLE HAVING ENHANCED ANTI-REFLECTIVE EFFECT

BACKGROUND OF THE INVENTION (1) Field of the Invention

This invention relates to a process for imparting a lower reflectance and a higher transmittance to a transparent shaped article.

(2) Description of the Prior Art

Reduction of the reflectance of a transparent shaped article and increase of the transmittance thereof are very important for effective utilization of rays of light and elimination of blurring of images occurring due to reflected images, and many methods have heretofore been proposed for attaining the reduction of reflectance and the increase of transmittance.

The principle of these proposed methods resides in that an optical thin film composed mainly of an inorganic substance having a refractive index different from that of a substrate is formed on the surface of the transparent substrate, to achieve reduction of the reflectance and increase of the transmittance. As means for enhancing this effect, there have been adopted a method in which a plurality of thin films differing in the refractive index are formed on a substrate by multi-coating procedures, a method in which the thicknesses of respective thin films are varied depending upon the wavelengths of corresponding rays of light, and a method in which a so-called optically heterogeneous film is formed on the surface of the transparent substrate, which film has a refractive index continuously varying through the thickness thereof.

For example, in the case of the method where a single anti-reflective thin film is formed on the surface of a substrate, it has been admitted that it is preferable that the anti-reflective thin film to be formed on the surface of the substrate be composed of an inorganic substance having a refractive index as low as possible, such as magnesium fluoride, and the optical thickness of the anti-reflective thin film be adjusted to $\frac{1}{4}$ of the wavelength of the objective ray of light.

Substrates to which such anti-reflective thin film can be applied are restricted by the process for forming the anti-reflective thin film. The substate to which such anti-reflective thin film has been most popularly applied is a glass substrate. The technique of coating a thin film of an inorganic substance on the surface of such a glass substrate is difficult to apply to other substrates of different materials or of a large size because many limitations are imposed.

As the above coating technique, there can be mentioned a vacuum evaporation deposition method, a sputtering method for improving the adhesion and an electron beam method. However, it is difficult to apply these coating methods to plastic materials which have recently been popularly used in the field of spectacle lenses and to plastic films and sheets on which anti-reflective thin films can advantageously be formed. Various problems arise when these coating methods are applied especially to plastic materials having a high-hardness coating formed thereon for improving the scratch resistance.

More specifically, plastic materials are ordinarily poor in heat resistance and they cannot resist the above-mentioned coating process, and such troubles as thermal degradation, melting thermal deformation and production of optical strain are often caused. Furthermore, the adhesion is ordinarily poor in plastic materials. These disadvantages are mainly due to the difference of the expansion coefficient between a plastic material and an inorganic substance to be coated thereon. If the adhesion is extremely reduced when the plastic material is exposed to an elevated temperature or a high humidity, cracks and other defects are often formed on the inorganic substance coating layer.

A more serious problem is how to eliminate a phenomenon in which the impact resistance and flexibility of a plastic material are drastically reduced by formation of such an inorganic substance coating layer. Namely, the superiority of plastic materials to glass materials is lost by the presence of such coating, and this is quite a serious problem.

SUMMARY OF THE INVENTION

It is, therefore, a primary object of the present invention to provide a process in which a transparent material exhibiting an enhanced anti-reflective effect can be produced without difficulty.

Another object and advantages of the present invention will be apparent from the following description.

In accordance with the present invention, there is provided a process for producing a transparent shaped article having an enhanced anti-reflective effect, which comprises treating with an activated gas, the surface of a transparent shaped article having a surface layer containing a finely divided particulate inorganic substance having an average particle size of about 1 to about 300 milli-microns.

DESCRIPTION OF THE PREFERRED EMBODIMENTS

The term "activating gas" used herein means a gas containing an ion, an electron and/or an excited gas, formed under normal pressure or reduced pressure. As means for generating such activated gas, there can be employed corona discharge and direct current, low frequency, high frequency or micro-wave high voltage discharge under reduced pressure. As the gas source used for the production of the activated gas, oxygen, air, nitrogen, argon and Freon (a fluorinated hydrocarbon) are preferably used.

The finely divided particulate inorganic substance that is used in the present invention has an average particle size of about 1 to about 300 milli-microns, preferably about 5 to about 200 milli-microns, and it is required that no substantial change of the form and state should be caused in the finely divided particulate inorganic substance by the activated gas treatment described hereinafter or, if any change is caused by the activated gas treatment, such change of the form and state is very small. It does not matter if parts or all of the fine particles are chemically changed by the activated gas treatment, but the form and state should be retained to such an extent that the intended effect of the present invention can be attained.

It is difficult to prepare particles having too small a particle size, and the use of particles having too large a particle size results in a reduction of the transparency and makes it impossible to attain the intended anti-reflective effect of the present invention. Accordingly, particles having a particle size falling within the above-mentioned range are used.

The fact that the form and shape of fine particles are not substantially changed by the activated gas treatment, or such change is very small, means that the form and shape of the fine particles are retained to such an extent that micropores formed by the activated gas treatment do not nullify the anti-reflective effect.

Even fine shallow dents and the like are included in the micropores referred to herein. The mechanism of manifesting the anti-reflective effect in the present invention has not been elucidated completely. However, the following presumption may be made.

In the case where micropores (having a refractive index substantially close to 1.00) are present homogeneously in the finely divided particulate inorganic substance, a thin layer formed of the micropores and particles present in such state will attain an effect that will probably be attained when an imaginary anti-reflective layer having a very low refractive index is formed. This presumption is in agreement with the fact that a similar effect can be obtained when a dispersion of fine particles is coated on a substrate to form a corresponding thin layer, although a problem, such as insufficient adhesion, is actually left unsolved in this case.

Any inorganic substance satisfying the above requirements can be used in the present invention and inorganic substances including organic substituents may also be used. However, the properties and kinds of inorganic substances should be determined according to not only the intended anti-reflective effect, but also according to other properties required. Oxides and halides of elements of the Groups II, III, IV and V of the Periodic Table are preferably used as the inorganic substance.

More specifically, fine particles of zinc oxide, silicon oxide, aluminum oxide, titanium oxide, zirconium oxide, tin oxide, beryllium chloride and antimony oxide are preferably used. Among them, fine particles of silicon oxide and aluminum oxide are especially preferred. These finely divided particulate inorganic substances may be used alone or in the form of a mixture of two or more.

The finely divided particulate inorganic substance should be incorporated in the transparent material at least in the surface layer portion thereof. As means for incorporating the finely divided particulate inorganic substance, at least in the surface layer portion of the transparent material, there may be adopted, for example, a method in which the inorganic substance is uniformly dispersed in the whole of the transparent material as the substrate or selectively dispersed in the surface layer portion of the transparent material prior to or during the step of shaping the transparent material, and a method in which the inorganic substance is dispersed in a transparent coating material and the dispersion is coated on the surface of a transparent shaped article.

Dispersing of the finely divided particulate inorganic substance can be accomplished by various known methods. For example, (a) a method in which the finely divided particulate inorganic substance is kneaded with the substrate (transparent material) under heating or at room temperature in the presence or absence of a solvent and other additive components, (b) a method in which the dispersion of the finely divided particulate inorganic substance is mixed with the substrate-constituting material (hereinafter referred to as "vehicle component") in a volatile dispersion medium and then, the volatile dispersion medium is evaporated, and (c) a method in which the finely divided particulate inorganic substance is dispersed in a monomer component and then, polymerization of the monomer component is carried out.

When a coating material having the finely divided particulate inorganic substance dispersed therein is used, it is preferred that the above method (b) be adopted for the preparation of the inorganic substance-dispersed coating material. In this case, it sometimes happens that the coating film formed by evaporation of the volatile dispersion medium is hardened. As the volatile dispersion medium, there can be used, for example, water, hydrocarbons, chlorinated hydrocarbons, esters, ketones, alcohols and organic carboxylic acids. These dispersion media may be used alone or in the form of a mixture of two or more.

The amount of the finely divided particulate inorganic substance incorporated into the transparent material is 5 to 80% by weight, preferably 10 to 70% by weight, in the surface layer portion to be treated with the activated gas. Usually, the surface layer portion to be treated with the activated gas has a thickness of up to 1 micron. If the amount is smaller than 5% by weight, no substantial effect can be attained by incorporation of the finely divided particulate inorganic substance, and, in contrast, if the amount is larger than 80% by weight, formation of cracks and reduction of transparency occur.

In the present invention, since it is desired to form a thin surface layer having an anti-reflective effect by treating the surface of the transparent material containing the finely divided particulate inorganic substance, the shape, size and intended use of the portion below this surface layer are not particularly critical. Accordingly, it is not particularly significant which method should be adopted for dispersing the finely divided particulate inorganic substance into the transparent substrate material, the method in which the inorganic substance is dispersed in the coating material and the dispersion is coated on the transparent substrate material (hereinafter referred to as "coating method") or the method in which the inorganic substance is directly dispersed in the substrate (transparent material). However, the following advantage can be attained when the coating method is adopted.

More specifically, in the case where the finely divided particulate inorganic substance cannot easily be dispersed in the substrate or properties of the substrate are adversely affected by dispersing the finely divided particulate inorganic substance, if the above-mentioned coating method is adopted, the anti-reflective effect can be imparted conveniently to the substrate without substantial influence on the properties of the substrate.

In dispersing the finely divided particulate inorganic substance, the inorganic substance having a fine powdery form before dispersing may be used, but in order to attain the intended object of the present invention effectively, it is preferable that the inorganic substance be used in the form of a colloidal dispersion in a liquid dispersion medium.

The kind of the base material in which the finely divided particulate inorganic substance is to be dispersed, that is, the vehicle component, is not particularly critical, so far as a part of or all of the base material is evaporated or extinguished by the activated gas treatment to form a micropore-containing surface of the inorganic substance. Ordinarily, organic group-containing compounds of various elements, such as organic compounds and/or organosilicon compounds, may be used, and high polymers of these compounds are especially preferable. For example, there can be mentioned epoxy resins, acrylic acid ester and/or methacrylic acid ester copolymers (inclusive of copolymers with other vinyl monomers), polyamides, polyesters (inclusive of so-called alkyd resins and unsaturated polyester resins), amino resins (inclusive of melamine resins and urea resins), urethane resins, polycarbonates, polyvinyl acetate resins, polyvinyl alcohol resins, styrene resins, transparent vinyl chloride resins, silicone resins, cellulose type resins and diethylene glycol bisallyl carbonate polymers (CR-39). Two or more of these resins may be used in combination, and a cured product obtained by using an appropriate curing agent may also be used. The vehicle component may further contain a plasticizer, a curing agent and a curing catalyst, and moreover, it may contain various additives such as a surface controlling agent, an ultraviolet absorber and an antioxidant.

By the term "transparent material" referred to in the present invention is meant a material having a haze value, defined by the following formula, of at most 80%, and the material may be colorless or may be colored with a pigment or dye:

$$\text{Haze value (\%)} = \frac{\text{diffuse transmittance}}{\text{total luminous transmittance}} \times 100$$

In order to enhance the intended effects of reducing the reflectance and improving the transmittance, it is preferable that a vehicle component having a high transparency be used. A silicone type polymeric compound used as a coating material for improving the surface hardness of a plastic article, or a polymeric compound containing such silicone type polymeric compound is effectively used as the vehicle component capable of manifesting not only the surface hardness enhancing effect, but also the anti-reflective effect. A composition comprising the above-mentioned polymeric compound and a dispersion of silicon oxide type fine particles in an alcoholic solvent and/or an aqueous solvent is especially valuable as the material capable of simultaneously manifesting the surface hardness-improving effect and the effect of improving the transmittance in the case where a transparent material having an especially high transmittance is desired.

Various methods have heretofore been proposed for forming coating films of silicone type polymers. Among these known methods, there is most effectively used, a method using a product formed by curing a member selected from compounds represented by the following general formula and hydrolysis products thereof:

$$R_a^1 R_b^2 Si(OR^3)_{4-(a+b)}$$

wherein $R^1$ and $R^2$ stand for an alkyl, aryl, halogenated alkyl, halogenated aryl or alkenyl group having 1 to 10 carbon atoms or an organic group including an epoxy, methacryloxy, acyloxy, mercapto, amino or cyano group, each of $R^1$ and $R^2$ is bonded to the silicon atom by the Si-C linkage, $R^3$ stands for an alkyl, alkoxyalkyl or acyl group having 1 to 4 carbon atoms, a and b are numbers of 0, 1 or 2, and the sum of a plus b is 1 or 2.

As examples of such organic silicon compounds, there can be mentioned trialkoxysilanes and triacyloxysilanes such as methyltrimethoxysilane, methyltriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-glycidoxypropyltrimethoxysilane, γ-glycidoxypropyltriethoxysilane, γ-(β-glycidoxyethoxy)propyltrimethoxysilane, β-(3,4-epoxycyclohexyl)ethyltrimethoxysilane, β-(3,4-epoxycyclohexyl)ethyltriethoxysilane, γ-methacryloxypropyltrimethoxysilane, γ-aminopropyltrimethoxysilane, γ-aminopropyltriethoxysilane, γ-mercaptopropyltrimethoxysilane, γ-mercaptopropyltriethoxysilane, N-(β-aminoethyl)-γ-aminopropyltrimethoxysilane and β-cyanoethyltriethoxysilane; and dialkoxysilanes and diacyloxysilanes such as dimethyldimethoxysilane, phenylmethyldimethoxysilane, dimethyldiethoxysilane, phenylmethyldiethoxysilane, γ-glycidoxypropylmethyldimethoxysilane, γ-glycidoxypropylmethyldiethoxysilane, γ-glycidoxypropylphenyldimethoxysilane, γ-glycidoxypropylphenyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptopropylmethyldiethoxysilane, γ-aminopropylmethyldimethoxysilane, γ-aminopropylmethyldiethoxysilane, methylvinyldimethoxysilane and methylvinyldiethoxysilane.

These organic silicon compounds may be used alone or in the form of a mixture of two or more. Various tetralkoxysilanes and hydrolysates thereof may be used in combination with the above-mentioned silane compounds, although they cannot be used alone. As the tetraalkoxysilane, there can be mentioned, for example, methyl silicate, ethyl silicate, n-propyl silicate, i-propyl silicate, n-butyl silicate, sec-butyl silicate and t-butyl silicate.

These organic silicon compounds can be cured even in the absence of a catalyst. However, various curing catalysts heretofore proposed may be used for promoting curing. For example, there can be used metal salts, especially alkali metal salts, and ammonium salts, of various acids and bases inclusive of Lewis acids and Lewis bases, such as organic carboxylic acids, chromic acid, hypochlorous acid, boric acid, bromic acid, selenious acid, thiosulfuric acid, orthosilicic acid, thiocyanic acid, nitrous acid, aluminic acid and carbonic acid, and alkoxides of aluminum, zirconium and titanium and complexes thereof. Naturally, these compounds can be used in combination with other organic substances, such as epoxy resins, acrylic copolymers and vinyl copolymers. As such organic substances, a hydroxyl group-containing polymer, for example, polyvinyl alcohol is especially valuable.

When the above-mentioned composition is used as the coating material, solvents and additives may be incorporated so as to facilitate the coating operation and maintain a good storage state.

When the above-mentioned composition is used as the coating material, the substrate is coated with the composition. The kind of the substrate is not particularly critical, so far as the intended object of the present invention is attained. However, from the viewpoint of the transparency, it is preferable that a glass material or transparent plastic material be used as the substrate. As the plastic material, there are preferably used polymethyl methacrylate, methyl methacrylate copolymers, polycarbonates, diethylene glycol bisallyl carbonate polymers (CR-39), polyesters, especially polyethylene terephthalate, unsaturated polyesters and epoxy resins. Coating, drying and/or curing can be accomplished according to methods appropriately selected among the known methods customarily adopted in the art of coating.

The transparent shaped article having an enhanced anti-reflective effect may be in the form of a film, a sheet or various molded articles. As such shaped articles, there can be mentioned, for example, films or sheets used for window panes, greenhouses, display cases, indication boards and gauge panelboards, and molded articles such as for television covers, optical lenses and spectacle lenses.

An anti-reflective thin film, the formation of which is one object of the present invention, is obtained by treating with an activated gas the surface portion of the transparent substrate or coated material, which surface portion comprises as the main ingredients the finely divided particulate inorganic substance and the vehicle component for dispersing therein the finely divided particulate inorganic substance.

In order to attain the objects of the present invention, an activated gas obtained by direct current, low frequency, high frequency or micro-wave high voltage discharge under a pressure of $10^{-2}$ to 10 Torr is especially preferable from the viewpoint of the treatment efficiency. The so obtained activating gas is so-called cold plasma, and the properties and generation methods of such cold plasma are described in detail in "Chemistry of Cold Plasma" (compiled by Keiichiro Hozumi and published by Nankodo, Japan in 1976).

The activated gas treatment conditions may be varied depending upon the shape and type of the treatment apparatus, the kind of the gas used and the material, composition, shape and size of the surface to be treated. Optimum conditions for attaining the objects of the present invention most effectively can be readily determined based on experiments. See Examples 1–30 which follow.

By the electron microscope observation, it has been confirmed that the treated thin film manifesting the intended effects of the present invention has micropores. Since the mechanism of the present invention and the shape and distribution state of micropores have not yet been elucidated sufficiently, the thickness of the micropore-present film cannot be defined specifically. However, it is believed that good results are obtained if the thickness of the micropore-present film is up to 1000 milli-microns, preferably up to 500 milli-microns.

It is preferable that a protecting coating material is coated on the surface of the substrate or coating material having the anti-reflective film layer in order to improve the mechanical properties and durability of the anti-reflective film layer.

The configuration of the so applied protecting coating material varies depending upon the material used, the coating composition (inclusive of the solvent) and the coating conditions, and it is construed that in some cases, micropores present in the anti-reflective film layer are partially filled with the protecting coating material or in other cases, the protecting coating material covers the anti-reflective layer without being introduced into micropores. Ordinarily, it is considered that the protecting coating material covers the micropores of the anti-reflective film layer in both the above two states. An appropriate protecting coating material is selected according to the relation to the lower layer and the required durability. In the present invention, either an inorganic material or an organic material can be used as the protecting coating material. This protecting coating material is applied in the form of a very thin layer. Accordingly, the transparency of the protecting coating material is not substantially important. However, from the viewpoint of the transparency of the entire structure, it is preferable that the protecting coating material be transparent. Materials mentioned above as the vehicle component can be used as the protecting coating material. Among them, from the viewpoint of improvement of the durability, it is preferable to use a protecting coating material containing a thermosetting resin. As the thermosetting resin, there can be mentioned, for example, epoxy resins, acrylic acid ester and/or methacrylic acid ester copolymers (inclusive of copolymers with other vinyl monomers), polyester resins, alkyd resins, unsaturated polyester resins and silicone type resins. Some of these thermosetting resins are cured at room temperature or under heating by themselves or with the aid of a catalyst, a ray of light, a radioactive ray or a curing agent. A pigment or dye and other additives may be incorporated into the thermosetting resin, so far as the transparency is not reduced. The protecting coating material is used and coated in the form of a dilute solution or dispersion obtained by dissolving or dispersing the protecting coating material in a volatile solvent. The concentration of the coating material may be varied depending upon the particular resin and solvent used and the anti-reflective film layer to be coated, and the concentration should be adjusted so that the desired coating amount is obtained. It is preferable that the amount of the coating material be 5 mg to 1 g, especially 10 to 500 mg, per m$^2$ of the surface of the transparent shaped article to be coated. If the amount coated is too small, no substantial protecting effect for the anti-reflective film layer can be obtained, and, in contrast, if the amount is too large, the anti-reflective effect is substantially reduced.

A necessary amount of the coating material can be coated in one coating operation, but the coating operation may be repeated several times so that the coating material is coated in the necessary amount as a whole. Furthermore, there may be adopted a method in which a curing agent is first coated and a coating material that can be cured by the curing agent is then coated, or the order of coating of the curing agent and coating material can be reversed.

Coating of the protecting coating material can be accomplished according to any of the coating methods customarily adopted in the field of coating, such as brush coating, dip coating, spin coating, flow coating, spray coating, roller coating and curtain flow coating. Furthermore, drying and/or curing can be performed according to methods customarily adopted in the field of coating.

The present invention will now be described in detail with reference to the following Examples.

EXAMPLE 1 AND COMPARATIVE EXAMPLE 1

(1) Preparation of Hydrolyzed Silane

A reaction vessel equipped with a rotor was charged with 2,124 g of γ-glycidoxypropyltrimethoxysilane, and 486 g of a 0.01 N aqueous solution of hydrochloric acid was gradually dropped to the charge while maintaining the liquid temperature at 10° C. under agitation by a magnetic stirrer. Cooling was stopped after completion of the dropwise addition. Thus, a hydrolyzed silane was obtained.

(2) Preparation of Coating Solution

To 312.3 g of the hydrolyzed silane was added 600 g of colloidal silica dispersed in methanol ("Methanol Silica Sol" manufactured by Nissan Kagaku Kabushiki Kaisha and having a solid content of 30% and an average particle size of 13±1 mμ under agitation. Then, 207.9 g of methanol, 60 g of diethylene glycol dimethyl ether and 1.8 g of a silicone type surface active agent were added to the dispersed liquid mixture, and 18 g of aluminum acetylacetonate was further added and the mixture was sufficiently stirred to form a coating solution.

(3) Coating, Treatment with Activated Gas and Evaluation

A diethylene glycol bisallyl carbonate polymer lens (plano-lens CR-39 having a diameter of 75 mm and a thickness of 2.1 mm) was dipped in an aqueous solution of sodium hydroxide and then washed. Thereafter, the lens was coated with the above-mentioned coating solution according to a dip coating method at a pull-out speed of 10 cm/min. The coating lens was heated and cured for 4 hours in a hot air drier maintained at 93° C. The coated lens was subjected to the activated gas treatment according to the following method. The total luminous transmittance was measured before and after the activated gas treatment.

A low temperature ashing apparatus ("Model IPC 1003B" manufactured by International Plasma Corporation) was used as the activated gas treatment apparatus. The treatment was carried out at an output of 50 W and a gas flow rate of 50 ml/min. Other treatment conditions and results of evaluation are shown in Table I, below. For comparison, the above procedures were repeated without adding colloidal silica dispersed in methanol. The obtained results are also shown in Table I, below.

When the coated lens obtained in Example 1 was subjected to the falling ball impact test according to FDA standards, no breakage of the lens was observed. Furthermore, when this lens was heat-treated at 120° C. for 2 hours, no cracks were formed and no other change was observed.

EXAMPLE 2

(1) Preparation of Coating Solution

A mixture of 27.8 g of an epoxy resin (sorbitol polyglycidyl ether manufactured and sold under the tradename of "Denacol EX-614" by Nagase Sangyo Kabushiki Kaisha), 48.5 g of methanol, 48.5 g of methyl ethyl ketone, 1.38 g of dichlorodimethylurea and 0.84 g of dicyandiamide was sufficiently stirred, and 92.7 g of the same methanol silica sol as used in Example 1 was added to the above mixture under agitation to form a coating solution.

(2) Coating, Activated Gas Treatment and Evaluation

Coating was carried out by using the so prepared coating solution in the same manner as described in Example 1. Curing was conducted at 130° C. for 2 hours.

The activated gas treatment and evaluation of the coated lens were carried out in the same manner as in Example 1. The treatment conditions and evaluation results are shown in Table I, below.

EXAMPLE 3 AND COMPARATIVE EXAMPLE 2

(1) Preparation of Acrylic Resin

A flask equipped with a stirrer was charged with 100 g of n-propyl alcohol, and the temperature was elevated to 90° to 95° C.

After elevation of the temperature, a mixed solution having the following composition, which was prepared separately, was dropped to the charge in the flask over a period of 2 hours.

| Mixed Solution: | |
|---|---|
| (a) Acrylic Acid | 4 g |
| (b) Hydroxyethyl methacrylate | 16 g |
| (c) Ethyl acrylate | 45 g |
| (d) Methyl methacrylate | 35 g |
| (e) n-Dodecylmercaptan | 2.0 g |
| (f) Azobisisobutyronitrile | 1.0 g |

After completion of the dropwise addition, 0.2 g of azobisisobutyronitrile was added every 30 minutes over a period of two hours, four times in all. After the final addition of azobisisobutyronitrile, heating was continued for 1 hour to form an acrylic resin solution.

(2) Preparation of Coating Solution

To 64 g of the so formed acrylic resin solution were added 9 g of a melamine resin ("Cymel 370" manufactured by Mitsui Toatsu Kagaku Kabushiki Kaisha), 80 g of ethylene chlorohydrin and 47 g of n-propyl alcohol, and the mixture was sufficiently stirred. Then, 133.4 g of colloidal silica sol dispersed in n-propanol (having a solid content of 30% and an average particle size of 13±1 mμ were added under agitation to the liquid mixture to form a coating solution.

(3) Coating, Activated Gas Treatment and Evaluation

Coating was carried out by using the so prepared coating solution in the same manner as described in Example 1. Curing was conducted at 130° C. for 2 hours.

The activated gas treatment and evaluation of the coated lens were carried out in the same manner as in Example 1. Treatment conditions and results of evaluation are shown in Table I, below. For comparison, the above procedures were repeated without addition of the silica sol. The obtained results are shown in Table I, below.

EXAMPLE 4 AND COMPARATIVE EXAMPLE 3

(1) Preparation of Acrylic Resin

An acrylic resin was prepared in the same manner as described in Example 3 except that a mixed monomer solution having the following composition was used.

| Mixed Solution: | |
|---|---|
| (a) Acrylic Acid | 12 g |
| (b) Hydroxyethyl methacrylate | 16 g |
| (c) Ethyl acrylate | 45 g |
| (d) Methyl methacrylate | 27 g |
| (e) n-Dodecylmercaptan | 2.0 g |
| (f) Azobisisobutyronitrile | 1.0 g |

(2) Preparation of Coating Solution

A coating solution was prepared by using the so prepared acrylic resin in the same manner as in Example 3.

(3) Coating, Activated Gas Treatment and Evaluation

The coating treatment, activated gas treatment and evaluation were carried out in the same manner as described in Example 3. The treatment conditions and evaluation results are shown in Table I, below. For comparison, the above procedures were repeated without addition of the silica sol. The obtained results are shown in Table I, below.

EXAMPLE 5 AND COMPARATIVE EXAMPLE 4

(1) Preparation of Hydrolyzed Silane

A reaction vessel equipped with a rotor was charged with 386.3 g of γ-glycidoxypropylmethyldiethoxysilane, and 55.8 g of a 0.05 N aqueous solution of hydrochloric acid was added dropwise to the charge under agitation by a magnetic stirrer while maintaining the liquid temperature at 10° C. After completion of the dropwise addition, cooling was stopped to obtain hydrolyzed silane.

(2) Preparation of Coating Solution

To 61.2 g of the so prepared hydrolyzed silane was added under agitation 125.0 g of the same methanol silica sol as used in Example 1. Then, 50.4 g of methanol, 9.3 g of diethylene glycol dimethyl ether and 0.4 g of a silicone type surfactant were added to the mixed dispersed liquid, and 7.02 g of aluminum acethylacetonate was further added and the mixture was sufficiently stirred to form a coating solution.

(3) Coating, Activated Gas Treatment and Evaluation

The coating treatment was carried out by using the so prepared coating solution in the same manner as in Example 1, and the activated gas treatment and evaluation were conducted in the same manner as in Example 1. The treatment conditions and evaluation results are shown in Table I, below. For comparison, the above procedures were repeated without addition of the methanol silica sol. The obtained results are shown in Table I, below.

EXAMPLE 6

(1) Preparation of Coating Solution

In 270 g of ethylene chlorohydrin was dissolved 30 g of cellulose acetate butyrate ("EAB-555-0.2" manufactured by Nagase Sangyo Kabushiki Kaisha), and 100 g of the same methanol silica sol as used in Example 1 was added to the solution and the mixture was stirred to form a coating solution.

(2) Coating, Activated Gas Treatment and Evaluation

The coating treatment was carried out by using the so prepared coating solution in the same manner as described in Example 1. Curing was conducted at 130° C. for 2 hours.

The activated gas treatment and evaluation of the coated lens were conducted in the same manner as described in Example 1. The treatment conditions and evaluation results are shown in Table I, below.

EXAMPLE 7 AND COMPARATIVE EXAMPLE 5

(1) Preparation of Coating Solution

To 441.8 g of hydrolyzed γ-glycidoxypropylmethyldiethoxysilane prepared in Example 5 was added 207.7 g of γ-chloropropyltrimethoxysilane, and 56.5 g of a 0.01 N aqueous solution of hydrochloric acid was gradually dropped to the mixture under agitation while maintaining the liquid temperature at 10° C. After completion of the dropwise addition, cooling was stopped. Then, 1354.3 g of the same methanol silica sol as used in Example 1, 103 g of diethylene glycol dimethyl ether, 791.6 g of methanol and 4.5 g of a silicone type surface active agent were added to 606 g of the so obtained hydrolysis product under agitation. Then, 40.6 g of aluminum acetylacetonate was further added to the mixture, and the resulting mixture was stirred to form a coating solution.

(2) Coating, Activated Gas Treatment and Evaluation

The coating treatment was carried out by using the so prepared coating solution in the same manner as in Example 1, and the activated gas treatment and evaluation were conducted in the same manner as described in Example 1. The treatment conditions and evaluation results are shown in Table I, below.

When the surface layer portion of the activated gas-treated lens was observed through an electron microscope (90,000 magnification), it was found that the surface was irregular and micropores were present in the surface portion over a depth of 1,000 Å from the top face.

For comparison, the above procedures were repeated without addition of the methanol silica sol. The obtained results are shown in Table I, below.

EXAMPLE 8

(1) Preparation of Coating Solution

To 30.6 g of hydrolyzed γ-glycidoxypropylmethyldiethoxysilane prepared in Example 5 was added 38.0 g of methyltrimethoxysilane, and the liquid temperature was maintained at 10° C. Then, 15.1 g of a 0.01 N aqueous solution of hydrochloric acid was gradually dropped to the mixture under agitation. After completion of the dropwise addition, cooling was stopped. Then, 125 g of the same methanol silica sol as used in Example 1, 26.7 g of methanol, 10.4 g of diethylene glycol dimethyl ether and 0.4 g of a silicone type surface active agent were added to 83.7 g of the hydrolysis product, and the mixture was stirred and 3.75 g of aluminum acetylacetonate was further added. The mixture was sufficiently mixed to form a coating solution.

(2) Coating, Activated Gas Treatment and Evaluation

The coating treatment was carried out by using the so prepared coating solution in the same manner as described in Example 1, and the activated gas treatment and evaluation were conducted in the same manner as described in Example 1. The treatment conditions and evaluation results are shown in Table I, below.

EXAMPLE 9

(1) Preparation of Coating Solution

A reaction vessel was charged with 83.1 g of γ-glycidoxypropylmethyldiethoxysilane and 44.7 g of phenyltrimethoxysilane, and the liquid temperature was maintained at 10° C. Then, 24.3 g of a 0.05 N aqueous solution of hydrochloric acid was gradually dropped to the mixture under agitation. After completion of the dropwise addition, cooling was stopped, and 291.8 g of the same methanol silica sol as used in Example 1, 46.6 g of methanol and 0.75 g of a silicone type surface active agent were added to the so formed hydrolysis product under agitation. Then, 8.75 g of aluminum acetylacetonate was added to the liquid mixture, and the mixture was stirred to form a coating solution.

(2) Coating, Activated Gas Treatment and Evaluation

The coating treatment was carried out by using the so prepared coating solution in the same manner as described in Example 1, and the activated gas treatment and evaluation were conducted in the same manner as described in Example 1. The treatment conditions and evaluation results are shown in Table I, below.

EXAMPLE 10

(1) Preparation of Coating Solution

To 442.1 of hydrolyzed γ-glycidoxypropylmethyldiethoxysilane prepared in Example 5 were added 155.4 g of an epoxy resin ("Epikote 827" manufactured by Shell Kagaku Kabushiki Kaisha), 223.8 g of diacetone alcohol and 111.6 g of benzyl alcohol, and the mixture was stirred to form a homogeneous solution. Then, 1,423 of the same methanol silica sol as used in Example 1, 597.5 g of methanol and 3.84 g of a silicone type surface active agent were added to the solution, and the mixture was sufficiently stirred. Then, 42.7 g of aluminum acetylacetonate was added to the liquid mixture, and the mixture was stirred to form a coating solution.

(2) Coating, Activated Gas Treatment and Evaluation

The coating treatment was carried out by using the so prepared coating solution in the same manner as described in Example 1, and the activated gas treatment and evaluation were conducted in the same manner as described in Example 1. The treatment conditions and evaluation results are shown in Table I, below.

EXAMPLES 11 THROUGH 13

(1) Preparation of Coating Solution

To 310.0 g of the hydrolyzed silane prepared in Example 7 were added 20 g of "Epiclon 750" (manufactured by Dainihon Ink Kagaku Kabushiki Kaisha), 39.6 g of diacetone alcohol, 130.4 g of methanol, 20 g of benzyl alcohol, 660.0 g of the same methanol silica sol as used in Example 1 and 1.8 g of a silicone type surfactant under agitation. Then 20 g of aluminum acetylacetonate was added to the liquid mixture, and the mixture was stirred to form a coating solution.

(2) Coating, Activated Gas Treatment and Evaluation

The coating treatment was carried out by using the so prepared coating solution in the same manner as described in Example 1, and the activated gas treatment and evaluation were conducted in the same manner as described in Example 1. The treatment conditions and evaluation results are shown in Table I, below.

EXAMPLES 14 THROUGH 16

(1) Preparation of Coating Solution

To 442.1 g of the hydrolyzed silane prepared in Example 5 were added 97.3 g of an epoxy resin ("Epikote 827" manufactured by Shell Kagaku Kabushiki Kaisha), 58.9 g of "Epikote 834" (manufactured by Shell Kagaku Kabushiki Kaisha), 77.7 g of "Denacal EX-320" (trimethylolpropane polyglycidyl ether manufactured by Nagase Sangyo Kabushiki Kaisha), 235.4 g of diacetone alcohol, 118.6 g of benzyl alcohol and 4.2 g of a silicone type surfactant, and the mixture was stirred to form a solution. Then, 1,678.6 g of the same methanol silica sol as used in Example 1 was added to the solution under agitation. Then, 50.6 g of aluminum acetylacetonate was added to the dispersed liquid mixture, and the mixture was stirred to form a coating solution.

(2) Coating, Activated Gas Treatment and Evaluation

A polycarbonate lens ("Rexan-141" manufactured by General Electric Co. and having a diameter of 60 mm and a thickness of 3.0 mm) was dip-coated with the so prepared coating solution at a pull-out speed of 10 cm/min. The coated lens was heated and cured for 2 hours in a hot air drier maintained at 130° C.

The activated gas treatment and evaluation of the coated lens were conducted in the same manner as described in Example 1. The treatment conditions and evaluation results are shown in Table I, below.

EXAMPLES 17 THROUGH 19

(1) Preparation of Hydrolyzed β-(3,4-epoxycyclohexyl)ethyltrimethoxysilane

A reaction vessel equipped with a rotor was charged with 168 g of β-(3,4-epoxycyclohexyl)ethyltrimethoxysilane, and while the liquid temperature was maintained at 20° C. under agitation by a magnetic stirrer, 37.2 of a 0.01 N aqueous solution of hydrochloric acid was gradually dropped to the charge. After completion of the dropwise addition, agitation was stopped to obtain hydrolyzed β-(3,4-epoxycyclohexyl)ethyltrimethoxysilane.

(2) Preparation of Coating Solution

To 394.4 g of hydrolyzed γ-glycidoxypropylmethyldiethoxysilane prepared in Example 5 was added 205.2 g of the so prepared hydrolyzed β-(3,4-epoxycyclohexyl)ethyltrimethoxysilane, and a solution comprising 24.8 g of "Epikote 827", 64.6 g of "Shodyne 508" (diglycidyl phthalate epoxy resin manufactured by Showa Denko Kabushiki Kaisha), 385 g of benzyl alcohol, 96.2 g of acetylacetone and 4.8 g of a silicone type surfactant, which was prepared separately, was added to the above liquid mixture. Then, 1,962 g of the same methanol silica sol as used in Example 1 was added to the liquid mixture, and 73.4 g of aluminum acetylacetonate was further added and the mixture was stirred to form a coating solution.

(3) Coating, Activated Gas Treatment and Evaluation

A lens prepared by injection molding of polymethyl methacrylate ("Acrypet" manufactured by Mitsubishi Rayon Kabushiki Kaisha and having a diameter of 75 mm and a thickness of 1.8 mm) was dip-coated with the so prepared coating solution at a pull-out speed of 10 cm/min, and the coated lens was cured for 2 hours in a hot air drier maintained at 97° C.

The activated gas treatment and evaluation of the coated lens were conducted in the same manner as described in Example 1. The treatment conditions and evaluation results are shown in Table I, below.

EXAMPLE 20

(1) Preparation of Coating Solution

To 46.87 g of the hydrolyzed silane prepared in Example 1 were added 85.51 g of an alumina sol ("Alumina Sol 200" manufactured by Nissan Kagaku Kabushiki Kaisha and having a solid content of 13.5% and an average particle size of 100 mµ×10 mµ), 6.62 g of ethylene chlorohydrin, 0.2 g of a silicone type surfactant and 1.93 g of aluminum acetylacetonate, and the mixture was sufficiently strirred to form a coating solution.

(2) Coating, Activated Gas Treatment and Evaluation

The coating treatment was carried out by using the so prepared coating solution in the same manner as in Example 1, and the activated gas treatment and evaluation were conducted in the same manner as described in Example 1. The treatment conditions and evaluation results are shown in Table I, below.

EXAMPLE 21

(1) Preparation of Coating Solution

To 331.9 g of hydrolyzed γ-glycidoxypropylmethyldiethoxysilane prepared in the same manner as described in Example 5 was added a solution having the following composition, which was prepared separately.

| (a) Epikote 827 | 87.95 g |
|---|---|
| (b) Epikote 834 | 21.99 g |
| (c) Denacol EX-320 | 65.97 g |
| (d) Benzyl alcohol | 136.70 g |

To the resulting mixed solution were added 227.87 g of diacetone alcohol, 223.31 g of n-butanol, 84.32 g of acetylacetone, 3.94 g of a silicone type surfactant, 1,770.5 g of methanol silica sol and 45.53 g of aluminum acetylacetonate, and the mixture was sufficiently stirred to form a coating solution.

(2) Coating, Activated Gas Treatment and Evaluation

A polycarbonate lens (plano-lens having a diameter of 65 mm and a thickness of 1.8 mm) was coated with the so prepared coating solution in the same manner as described in Example 1. Curing was conducted at 130° C. for 2 hours.

The activated gas treatment and evaluation of the coated lens were conducted in the same manner as described in Example 1. The treatment conditions and evaluation results are shown in Table I, below.

EXAMPLE 22

(1) Preparation of Hydrolyzed Silane

A reaction vessel equipped with a rotor was charged with 38.0 g of methyltrimethoxysilane, 28.8 g of phenyltrimethoxysilane and 12.5 g of acetic acid, and 22.9 g of a 0.01 N aqueous solution of hydrochloric acid was gradually dropped to the mixture under agitation by a magnetic stirrer while maintaining the liquid temperature at 10° C. After completion of the dropwise addition, cooling was stopped to obtain a hydrolyzed silane.

(2) Preparation of Coating Solution

To 51.2 g of the so prepared hydrolyzed silane were added 77.0 g of colloidal silica dispersed in ethylene chlorohydrin (having a solid contnet of 24.3% and an average particle size of 13±1 mµ), 6.4 g of diethylene glycol dimethyl ether, 0.2 g of a silicone type surfactant and 0.34 g of sodium acetate, and the mixture was sufficiently stirred to form a coating solution.

(3) Coating, Activated Gas Treatment and Evaluation

Coating was carried out by using the so prepared coating solution in the same manner as described in Example 1. Curing was conducted at 130° C. for 2 hours.

The activated gas treatment and evaluation of the coated lens were conducted in the same manner as described in Example 1. The treatment conditions and evaluation results are shown in Table I, below.

EXAMPLE 23

A diethylene glycol bisallyl carbonate polymer sheet ("CR-39" sheet having a thickness of 2.0 mm) was coated with the coating solution prepared in Example 10 in the same manner as described in Example 1, and the sheet was subjected to the same activating gas treatment as described in Example 1. The treatment conditions and results of evaluation of the resulting coated sheet are shown in Table I, below.

EXAMPLE 24

(1) Preparation of Hydrolyzed Silane

A reaction vessel equipped with a rotor was charged with 112.6 g of γ-glycidoxypropylmethyldiethoxysilane and 60.8 g of γ-chloropropyltrimethoxysilane, and while the liquid temperature was maintained at 10° C. under agitation by a magnetic stirrer, 33 g of a 0.05 N aqueous solution of hydrochloric acid was gradually dropped to the charge. After completion of the dropwise addition, cooling was stopped to obtain a hydrolyzed silane.

(2) Preparation of Coating Solution

To 154.8 g of the so prepared hydrolyzed silane was added 330 g of the same methanol silica sol as used in Example 1 under agitation. Then 10.1 g of "Epiclon 750" (manufactured by Dainihon Ink Kagaku Kabushiki Kaisha), 19.8 g of diacetone alcohol, 10.1 g of benzyl alcohol, 64.5 g of methanol and 1 g of a silicone type surfactant were added to the liquid mixture, and the mixture was sufficiently stirred. Then, 10 g of aluminum acetylacetonate were added to the mixture, and the resulting mixture was sufficiently stirred to form a coating solution.

(3) Coating, Activated Gas Treatment and Evaluation

A polyethylene terephthalate film (manufactured and sold under the tradename of "Lumilar T-125 Sand Mat" by Toray Industries Inc.) was coated with the so prepared coating solution. Coating and curing were conducted in the same manner as described in Example 14. The activated gas treatment and evaluation were conducted in the same manner as described in Example 1. The treatment conditions and evaluation results are shown in Table I, below.

TABLE I

| Run No. | Example No. | Activated Gas Treatment Conditions Time (minutes) | Gas | Total Luminous Transmittance (%) Before Treatment | After Treatment |
|---|---|---|---|---|---|
| 1 | Example 1 | 3 | Oxygen | 92.76 | 97.28 |
|  | Comp. Ex. 1 | 3 | Oxygen | 92.28 | 92.08 |
| 2 | Example 2 | 0.5 | Oxygen | 92.04 | 96.80 |
| 3 | Example 3 | 0.5 | Oxygen | 92.62 | 97.45 |
|  | Comp. Ex. 2 | 0.5 | Oxygen | 92.20 | 92.48 |
| 4 | Example 4 | 0.5 | Oxygen | 92.68 | 97.37 |
|  | Comp. Ex. 3 | 0.5 | Oxygen | 92.05 | 92.28 |
| 5 | Example 5 | 5 | Oxygen | 93.01 | 97.62 |
|  | Comp. Ex. 4 | 5 | Oxygen | 92.58 | 92.66 |
| 6 | Example 6 | 0.5 | Oxygen | 90.34 | 96.30 |
| 7 | Example 7 | 10 | Oxygen | 92.89 | 97.30 |
|  | Comp. Ex. 5 | 10 | Oxygen | 92.69 | 92.34 |
| 8 | Example 8 | 3 | Oxygen | 93.16 | 95.58 |
| 9 | Example 9 | 3 | Oxygen | 92.31 | 97.98 |
| 10 | Example 10 | 1 | Oxygen | 92.33 | 98.50 |
| 11 | Example 11 | 3 | Oxygen | 92.55 | 98.80 |
| 12 | Example 12 | 3 | Nitrogen | 92.60 | 94.28 |
| 13 | Example 13 | 5 | Air | 92.60 | 97.87 |
| 14 | Example 14 | 1 | Oxygen | 88.55 | 94.44 |
| 15 | Example 15 | 3 | Nitrogen | 89.04 | 95.51 |
| 16 | Example 16 | 3 | Air | 89.04 | 95.86 |
| 17 | Example 17 | 1 | Oxygen | 92.28 | 97.61 |
| 18 | Example 18 | 3 | Nitrogen | 92.70 | 97.83 |
| 19 | Example 19 | 3 | Air | 92.70 | 98.82 |
| 20 | Example 20 | 3 | Oxygen | 87.53 | 90.77 |
| 21 | Example 21 | 3 | Oxygen | 93.10 | 97.06 |
| 22 | Example 22 | 5 | Oxygen | 92.62 | 94.51 |
| 23 | Example 23 | 1 | Oxygen | 92.40 | 98.71 |
| 24 | Example 24 | 2.8 | Oxygen | 72.90 | 74.89 |

COMPARATIVE EXAMPLE 6

An inorganic oxide composed mainly of SiO and $SiO_2$ was coated in a thickness of 1.5 microns by vacuum evaporation deposition on a diethylene glycol bisallyl carbonate polymer lens (plano-lens having a diameter of 70 mm and a thickness of 2.1 mm) to obtain an anti-reflective lens. The total luminous transmittance of the obtained lens was 96.0%. When the lens was subjected to the falling ball impact test according to FDA standards, the lens was destroyed in contrast to the lens in Example 1.

When the above anti-reflective lens was heated in an oven maintained at 70° C., many cracks were formed on the surface of the lens.

EXAMPLE 25 AND COMPARATIVE EXAMPLE 7

(1) Preparation of Hydrolyzed Silane

A reaction vessel equipped with a rotor was charged with 84.6 g of γ-glycidoxypropylmethyldiethoxysilane and 45.8 g of phenyltrimethoxysilane, and 24.6 g of a 0.05 N aqueous solution of hydrochloric acid was gradually dropped to the charge while maintaining the liquid temperature at 10° C. under agitation by a magnetic stirrer. Agitation was continued after completion of the dropwise addition. Thus, the reaction was conducted for about 40 minutes, and a hydrolyzed silane was obtained.

(2) Preparation of Coating Solution

A liquid mixture of 10 g of an epoxy resin ("Epiclon 750" manufactured and sold by Dainihon Ink Kagaku Kabushiki Kaisha), 10 g of benzyl alcohol, 19.8 g of diacetone alcohol and 0.9 g of a silicon type surfactant was added to the above-mentioned hydrolyzed silane under agitation. Then, 330 g of colloidal silica in methanol, similar to that used in Example 1, 10 g of aluminum acetylacetonate and 65.2 g of methanol were added to the mixture in this order. Then, the mixture was sufficiently stirred to form a coating solution.

(3) Coating and Treatment with Activated Gas

A diethylene glycol bisallyl carbonate polymer lens (plano-lens CR-39 was having a diameter of 71 mm and a thickness of 2.1 mm) was dipped in an aqueous solution of sodium hydroxide and then washed. Thereafter, the lens was coated with the above-mentioned coating solution according to a dip coating method at a pull-out speed of 10 cm/min. The coated lens was preliminarily heated at 82° C. for 10 minutes and then cured for 4 hours in a hot air drier maintained at 93° C. The coated lens was subjected to the activated gas treatment according to the following method.

A low temperature ashing apparatus (Model IPC 1003B manufactured by International Plasma Corporation) was used as the activated gas treatment apparatus. The treatment was carried out at an output of 50 W and an oxygen flow rate of 50 ml/min for 210 seconds. The total luminous transmittance, which was 92.4% before the treatment, was increased to 98.3% by this treatment.

(4) Preparation and Coating of Protecting Coating Material 14.2 g of γ-glycidoxypropyltrimethoxysilane was hydrolyzed at 10° C. in the same manner as described in preceding paragraph (1) by using a 0.01 N aqueous solution of hydrochloric acid. Then, 984 g of methanol and 0.5 g of aluminum acetylacetonate were added to the hydrolysis product and the mixture was sufficiently stirred. A protecting coating layer was formed on the anti-reflective lens, which was obtained in preceding paragraph (3), by using the so formed coating material. The pull-out speed adopted for the coating operation was 10 cm/min. The coated lens was preliminarily heated at 82° C. for 10 minutes and then cured at 93° C. for 2 hours.

The obtained lens had a total luminous transmittance of 96.7% and an anti-reflective effect. Properties of the so obtained lens and the lens having no protecting coating as a comparative lens are shown in Table II, below. From the results shown in Table II, it will readily be understood that the mechanical strength and durability can be improved by the protective coating.

TABLE II

|  | Lens Having Protective Coating | Lens Having No Protective Coating |
|---|---|---|
| Total Luminous transmittance (%) | 96.7 | 98.3 |
| Surface hardness*[1] (steel wool) | Scratched to a negligible extent | Anti-reflective surface layer separated |
| Adhesion*[2] (room temperature) | Not changed | Not changed |
| (after dipping in hot water at 70° C. for 1 hour) | Not changed | Anti-reflective surface layer separated |

Note
*[1] Abrasive test with steel wool #0000 under a load of 1.5 Kg was conducted 10 times.
*[2] Square cuts (10 × 10) having a size of 1 mm were formed by a safety razor blade and an adhesive tape was applied to these square cuts and then peeled.

EXAMPLE 26 AND COMPARATIVE EXAMPLE 8

A lens sample was prepared in the same manner as described in Example 25. A mixture of 84.4 g of γ-glycidoxypropylmethyldiethoxysilane and 45.6 g of γ-chloropropyltrimethoxysilane was hydrolyzed with 24.8 g of 0.05 N hydrochloric acid. A coating solution was prepared by adding the following components to the hydrolysis product.

| | |
|---|---|
| Epiclon 750 | 10.1 g |
| Methanol silica sol | 330.0 g |
| Diacetone alcohol | 19.8 g |
| Benzyl alcohol | 10.1 g |
| Silicone type surfactant | 0.9 g |
| Aluminum acetylacetonate | 10.1 g |
| Methanol | 64.5 g |

The sample was coated with the above coating solution and then cured in the same manner as described in Example 25 and the coated sample was treated at an oxygen flow rate of 100 ml/min and an output of 50 W for 20 minutes by using a surface-treating plasma apparatus ("Model PR 501A" manufactured by Yamato Kagaku Kabushiki Kaisha).

A protective coating was formed on the treated sample in the same manner as described in Example 25 by using a coating composition comprising 3.46 g of a product obtained by hydrolyzing γ-glycidoxypropyltrimethoxysilane (2.82 g) with 0.01 N hydrochloric acid (0.64 g), 0.008 g of a silicone type surfactant and 396.5 g of n-propanol.

Properties of the so prepared lens and the comparative lens having no protecting coating are shown in Table III, below.

TABLE III

| | Lens Having Protecting Coating | Lens Having No Protecting Coating |
|---|---|---|
| Total Luminous transmittance | 97.0% | 98.5% |
| Surface hardness (steel wool) | Scratched to a negligible extent | Anti-reflective surface layer separated |
| Adhesion (room temperature) | Not changed | Not changed |
| (After dipping in hot water at 70° C. for 1 hour) | Not changed | Anti-reflective surface layer peeled off |
| Framing test*1 | Not changed | Grip marks left on lens |
| Outdoor exposure (2 months in Florida) | Not changed | Anti-reflective surface layer partially separated |

Note:
*1The lens was cut by a Takubo automatic diamond lens edger.

EXAMPLE 27

An anti-reflective lens was prepared according to the method described in Example 25 or 26, and a protecting coating material shown in Table IV, below, was coated on the lens. Each coated lens was found to have a durability improved over the durability of the comparative lens having no protecting coating. Each protecting coating material contained aluminum acetylacetonate as a catalyst in an amount of 5% by weight based on the total solids in addition to the components shown in Table IV. The silane compound was used after it had been hydrolyzed with an equivalent amount of water (rendered acidic by hydrochloric acid) in the same manner as in Example 25 or 26.

TABLE IV

| Base Material*1 | Protecting Coating Material | Solid Content in Coating Solution (%) | Total Luminous Transmittance (%) | Durability Test*2 |
|---|---|---|---|---|
| A | Not coated | — | 98.2 | Poor |
| A | γ-Glycidoxypropyltrimethoxysilane/methanol silica sol (50/50) | 2 | 97.0 | Good |
| A | Methyltrimethoxysilane | 1 | 97.1 | Good |
| A | Methyltrimethoxysilane/methanol silica sol (50/50) | 3 | 96.3 | Good |
| A | γ-Glycidoxypropylmethyldiethoxysilane | 1 | 96.9 | Good |
| A | γ-Glycidoxypropylmethyldiethoxysilane/methanol silica sol (50/50) | 2 | 97.0 | Good |
| A | γ-Glycidoxypropylmethyldiethoxysilane/phenyltrimethoxysilane (50/50) | 1 | 96.2 | Good |
| A | γ-Glycidoxypropylmethyldiethoxysilane/γ-chloropropyltrimethoxysilane (50/50) | 1 | 97.0 | Good |
| A | γ-Glycidoxypropylmethyl diethoxysilane/β-(3,4-epoxycyclohexyl)ethyltrimethoxysilane (50/50) | 1 | 96.5 | Good |
| B | γ-Glycidoxypropylmethyldiethoxysilane | 0.5 | 97.1 | Good |
| B | Methyltrimethoxysilane | 0.5 | 96.8 | Good |
| B | γ-Glycidoxypropyltrimethoxysilane/Epikote 827*3 (20/10) | 0.5 | 96.1 | Good |
| B | γ-Glycidoxypropyltrimethoxysilane/Denacol EX314*4 (20/20) | 0.5 | 95.7 | Good |
| B | γ-Glycidoxypropyltrime- | 0.5 | 96.3 | Good |

TABLE IV-continued

| Base Material[1] | Protecting Coating Material | Solid Content in Coating Solution (%) | Total Luminous Transmittance (%) | Durability Test[2] |
|---|---|---|---|---|
| B | thoxysilane/Denacol EX820[5] (20/10) γ-Glycidoxypropyltrimethoxysilane/Shodyne 508[6] | 0.5 | 96.1 | Good |

Note
[1] A: plastic lens having an anti-reflective layer, formed in Example 25
B: plastic lens having an anti-reflective layer, formed in Example 26
[2] Adhesion test after hot water dipping at 70° C. for 30 minutes, and friction test with wool felt under a load of 130 g, repeated 200 times
[3] Bisphenol type epoxy resin (manufactured by Shell Kagaku Kabushiki Kaisha)
[4] Glycerol polyglycidyl ether (manufactured by Nagase Sangyo Kabushiki Kaisha)
[5] Polyethylene glycol diglycidyl ether (manufactured by Nagase Sangyo Kabushiki Kaisha)
[6] Diglycidyl phthalate (manufactured by Showa Denko Kabushiki Kaisha)

EXAMPLE 28

In coating a lens having an anti-reflective layer, obtained according to the method described in Example 26, with a protecting coating material, the amount coated was varied by increasing or decreasing the amount of the solvent in the coating solution. The obtained results are shown in Table V, below, from which it will readily be understood that the anti-reflective effect is degraded if the amount coated is too large.

TABLE V

| Amount of Protecting Coating Material (mg/m$^2$) | Total Luminous Transmittance (%) |
|---|---|
| 0 | 98.3 |
| 20 | 97.2 |
| 50 | 96.2 |
| 100 | 95.6 |
| 1,200 | 92.3 |

EXAMPLE 29

(1) Preparation of Acrylic Resin

A mixture of monomers, catalyst and chain transfer agent, having a composition shown below, was dropped into 100 g of n-propanol maintained at 95° C. over a period of 1 hour. The catalyst to be added afterwards (azobisisobutyronitrile) was added two times (at an interval of 30 minutes; the amount added at each time being 0.2 g), and then, polymerization was conducted for 1 hour.

| | |
|---|---|
| Ethyl acrylate | 66 g |
| Methyl methacrylate | 10 g |
| 2-Hydroxyethyl methacrylate | 14 g |
| Methacrylic acid | 10 g |
| n-Dodecylmercaptan | 1 g |
| Azobisisobutyronitrile | 1 g |

(2) Preparation of Glass-Coating Solution

A mixture of 48 g of the acrylic resin solution formed in (1) above, 6 g of a melamine resin ("Cymel 303" manufactured by American Cyanamid Co.) and 86.4 g of n-propanol was stirred and 100 g of propanol silica sol (having a solid content of 30% and an average particle size of 13±1 mμ) was added to the mixture being stirred to form a coating solution.

(3) Coating of Glass and Activated Gas Treatment

A soda glass sheet was sufficiently washed and treated with a silicone type coupling agent having a concentration of 2%. Then, the glass sheet was dipped in the coating solution formed in (2) above and coated with the coating solution, and the coated glass sheet was cured at 180° C. for 30 minutes to obtain a glass sheet having a transparent coating. The total luminous transmittance of the glass sheet was 91.6%.

The coated glass sheet was subjected to the activated gas treatment using oxygen for 4 minutes in the same manner as described in Example 26. The total luminous transmittance of the so treated coated glass sheet was 97.8%, and the glass sheet was found to have an anti-reflective effect.

(4) Coating with Protecting Coating Material

The coating material formed in (2) above was diluted with n-propanol so that the solid content was 1% by weight, and the anti-reflective glass sheet formed in (3) above was dip-coated with the so prepared protecting coating material, at a pull-out speed of 10 cm/min. The coated glass sheet was cured at 180° C. for 20 minutes. The total luminous transmittance of the obtained coated glass sheet was 96.2%, and even when the abrasive test using wool felt was carried out 500 times, no peeling of the anti-reflective coating was observed. When the comparative glass sheet having no protecting coating was subjected to abrasive test in the same manner as above, peeling of the anti-reflective layer was observed.

EXAMPLE 30

A lens sample having an anti-reflective layer was prepared by conducting the treatments up to the activated gas treatment in the same manner as described in Example 26. This lens sample was coated with a coating material (A) described in (a) below at a pull-out speed of 10 cm/min and was then heated and dried at 82° C. for 10 minutes. Then, the coated lens was further coated with a coating material (B) described in (b) below at a pull-out speed of 10 cm/min. The coated lens was preliminarily dried at 82° C. for 10 minutes and then cured at 130° C. for 2 hours. The obtained lens sample had a total luminous transmittance of 96.7% and exhibited very light blue reflection interference color. The lens was scratched only to a negligible extent by rubbing it with steel wool (#0000), and even if it was dipped in hot water at 80° C. for 1 hour, no change was observed. Furthermore, when it was subjected to the outdoor exposure test for two months in Florida, USA, no change was observed. This lens could be dyed with a disperse dye stuff.

(a) The protecting coating material (A) was prepared in the following manner.

A liquid mixture of 11.1 g of γ-(N-2-aminoethyl-)aminopropyltrimethoxysilane ("SH-6020" manufactured and sold by Toray Silicone Kabushiki Kaisha) and 24.2 g of methanol was hydrolyzed with 2.7 g of 0.01 N hydrochloric acid at 20° C. Then, 500 g of methanol was added to 0.5 g of the obtained liquid product to adjust the solid content to 0.02% by weight.

(b) The protecting coating material (B) was prepared in the following manner.

A solution of hydrolyzed γ-glycidoxypropyltrimethoxysilane in n-propyl alcohol was prepared in the same manner as described in Example 26. The solid content of the solution was 0.5% by weight.

We claim:

1. A process for producing a transparent shaped article having an enhanced anti-reflective effect, said article either being an organic material or having a coating of organic material thereon which comprises treating with an activated gas the surface of a transparent shaped article, said surface layer comprising a finely divided particulate inorganic substance having an average particle size of from about 1 to about 300 milli-microns dispersed in said organic material.

2. A process according to claim 1, wherein the finely divided particulate inorganic substance has an average particle size of from about 5 to about 200 milli-microns.

3. A process according to claim 1 or 2, wherein the finely divided particulate inorganic substance comprises at least one substance selected from the group consisting of oxides and halides of elements of Groups II, III, IV and V of the Periodic Table.

4. A process according to claim 1 or 2, wherein the finely divided particulate inorganic substance comprises at least one substance selected from the group consisting of zinc oxide, silicon oxide, aluminum oxide, titanium oxide, zirconium oxide, tin oxide, beryllium chloride and antimony oxide.

5. A process according to claim 1, wherein the transparent shaped article having the surface layer comprising the finely divided particulate inorganic substance is prepared by dispersing the finely divided particulate inorganic substance in a transparent material for the shaped article prior to or during the step of shaping the transparent material.

6. A process according to claim 1, wherein the transparent shaped article having the surface layer comprising the finely divided particulate inorganic substance is prepared by coating a transparent shaped article with a transparent organic coating material having dispersed therein the finely divided particulate inorganic substance.

7. A process according to claim 6, wherein the transparent organic coating material having dispersed therein the finely divided particulate inorganic substance is prepared by mixing the finely divided inorganic substance together with a transparent organic vehicle component in a volatile dispersing liquid medium.

8. A process according to claim 7, wherein the transparent organic vehicle component is at least one substance selected from the group consisting of epoxy resins, acrylic acid ester and/or methacrylic acid ester copolymers, polyamides, polyesters, amino resins, urethane resins, polycarbonates, polyvinyl acetate resins, polyvinyl alcohol resins, styrene resins, transparent vinyl chloride resins, silicone resins, cellulose type resins and diethylene glycol bisallyl carbonate polymers.

9. A process according to claim 7, wherein the transparent organic vehicle component comprises at least one silicon compound selected from the group consisting of compounds represented by the following general formula and hydrolysis products thereof:

$$R_a^1 R_b^2 Si(OR^3)_{4-(a+b)}$$

wherein $R^1$ and $R^2$ stand for an alkyl, aryl, halogenated alkyl, halogenated aryl or alkenyl group having 1 to 10 carbon atoms or an organic group including an epoxy, methacryloxy, acryloxy, mercapto, amino or cyano group, each of $R^1$ and $R^2$ is bonded to the silicon atom by the Si-C linkage, $R^3$ stands for an alkyl, alkoxyalkyl or acyl group having 1 to 4 carbon atoms, a and b are numbers of 0, 1 or 2, and the sum of a plus b is 1 or 2.

10. A process according to claim 1 or 2, wherein the amount of the finely divided particulate inorganic substance contained in the transparent shaped article is 5 to 80% by weight in the surface layer portion to be treated with the activated gas.

11. A process according to claim 5, 6 or 7, wherein the finely divided particulate inorganic substance to be dispersed is in the form of a colloidal dispersion in a liquid medium.

12. A process according to claim 1, wherein the body of the transparent shaped article is made of a transparent material selected from glass, polymethyl methacrylate, methyl methacrylate copolymers, polycarbonates, diethylene glycol bisallyl carbonate polymers, polyesters and epoxy resins.

13. A process according to claim 1, wherein the activated gas is a gas containing an ion, an electron and/or an excited gas, formed from oxygen, air, nitrogen, argon or freon by using a corona discharge means or a direct current, low frequency, high frequency or microwave high voltage discharge means.

14. A process according to claim 1, wherein the activated gas is a cold plasma obtained by means of direct current, low frequency, high frequency or micro-wave high voltage discharge under a pressure of $10^{-2}$ to 10 Torr.

15. A process according to claim 1, wherein the transparent shaped article treated with the activated gas is coated with a protective coating material.

16. A process according to claim 15, wherein the protective coating material is at least one thermosetting resin selected from the group consisting of epoxy resins, acrylic acid ester copolymers, methacrylic acid ester copolymers, polyester resins, alkyd resins, unsaturated polyester resins and silicone resins.

17. A process according to claim 15 or 16, wherein the amount of the protective coating material is in the range of from 5 mg to 1 g per m² of the surface of the transparent shaped article to be coated.

18. A process for producing a transparent shaped article having an enhanced anti-reflective effect, said article being either organic material or having a coating of organic material thereon, which comprises treating with an activated gas the surface of a transparent shaped article having a surface layer comprising a finely divided particulate inorganic substance having an average particle size of from about 1 to about 300 millimicrons dispersed in said organic material, whereby the organic portion of the surface layer is partially etched thereby forming the anti-reflective layer.

19. A process for producing a transparent shaped article having an enhanced anti-reflective effect, which comprises treating with an activated gas the surface layer of a transparent shaped article having a surface layer containing a finely divided particulate inorganic substance having an average particle size of from about 1 to about 300 millimicrons whereby said activated gas partially etches the surface layer of the transparent shaped article and leaves said finely divided particulate inorganic substance substantially unchanged in form and state to form the anti-reflective layer.

* * * * *

UNITED STATES PATENT AND TRADEMARK OFFICE
CERTIFICATE OF CORRECTION

PATENT NO. : 4,374,158
DATED : February 15, 1983
INVENTOR(S) : Takashi Taniguchi and Jiro Mibae It is certified that error appears in the above-identified patent and that said Letters Patent is hereby corrected as shown below:

In column 5, line 57, please delete "acyloxy" and insert --acryloxy--.

Signed and Sealed this

Seventeenth Day of May 1983

[SEAL]

Attest:

DONALD J. QUIGG

Attesting Officer

Acting Commissioner of Patents and Trademarks